United States Patent [19]

Imagawa et al.

[11] Patent Number: 5,455,412
[45] Date of Patent: Oct. 3, 1995

[54] DOCUMENT SCANNER EMPLOYING A TEST CHART TO CORRELATE THE INDEPENDENT MOTION OF THE LIGHT SOURCE AND THE READER

[75] Inventors: Takashi Imagawa, Nara; Fumikazu Nagano, Yamato-Koriyama, both of Japan

[73] Assignee: Sharp Kabushiki Kaisha, Osaka, Japan

[21] Appl. No.: 233,691

[22] Filed: Apr. 26, 1994

[30] Foreign Application Priority Data

Apr. 27, 1993 [JP] Japan .................. 5-101400

[51] Int. Cl.$^6$ .................. H01J 40/14
[52] U.S. Cl. .................. 250/208.1; 250/234; 358/406; 358/474
[58] Field of Search .................. 250/208.1, 234, 250/235; 358/406, 474, 497, 486, 409, 412, 420

[56] References Cited

U.S. PATENT DOCUMENTS

| | | | |
|---|---|---|---|
| 4,893,196 | 1/1990 | Koshiyouji et al. | 358/474 |
| 5,130,525 | 7/1992 | Ryon | 250/208.1 |
| 5,245,440 | 9/1993 | Sato | 358/406 |
| 5,282,053 | 1/1994 | Robideau | 358/406 |
| 5,309,205 | 5/1994 | Hayano | 355/243 |

FOREIGN PATENT DOCUMENTS 4-156167  5/1992  Japan .

*Primary Examiner*—Edward P. Westin
*Assistant Examiner*—Steven L. Nichols
*Attorney, Agent, or Firm*—David G. Conlin; Kevin J. Fournier

[57] ABSTRACT

A scanner is so arranged that a quantity of light reaching a CCD sensor can be kept constant with a change in reading position. In case a light source and a reading optical unit are driven independent of each other, variations in feed amount inevitably occur. To deal with it, a test chart of a specified length is first read to measure moving amounts of the light source and the reading optical unit. Then, the reading optical unit is moved by a predetermined amount. The light source is moved as effecting a correction based on the moving amounts initially measured. Then, a one-line reading process is carried out to scan an image on a document.

10 Claims, 7 Drawing Sheets

DOCUMENT SCANNER EMPLOYING A TEST CHART TO CORRELATE THE INDEPENDENT MOTION OF THE LIGHT SOURCE AND THE READER

BACKGROUND OF THE INVENTION

1. Field of the Invention

The present invention relates to a scanner using a linear CCD sensor. More particularly, the invention relates to a scanner which is adjusted in feed amount to stabilize a quantity of light during scan.

2. Related Background Art

Scanners are widely used these days as means for inputting document or graphic data into a computer, or as input means for digital copier or facsimile device.

A scanner is operated in such a manner that strong light from a light source is let to impinge on a surface of document to be read and that reflected light from the document is guided through an optical system to form an image on an image sensor. The image sensor reads the image while photoelectrically converting an optical signal into an electric signal of a voltage level proportional to the intensity of reflected light, that is, the density of document in the unit of pixel. The electric signal is amplified and subjected to analog-to-digital conversion to obtain digital data. The digital data is transferred to a host system.

A most popularly used image sensor is a linear CCD sensor in which pixels are aligned on a line, which can read image information while scanning the document by a mechanical unit.

FIG. 5 is a block diagram to show a CCD sensor used in scanner. In FIG. 5, $S_1, S_2, \ldots, S_N$ designate light receiving elements (photodiodes), $SR_1, SR_2, \ldots, SR_N$ analog shift registers (CCD) for shifting out analog outputs from the light receiving elements, and BUFFER an output buffer. Also, SH represents a start pulse for starting a shift operation of the shift registers, $\phi_1, \phi_2$ shift register transfer clocks, $\phi_R$ a reset pulse, and CCDOUT a CCD output.

FIG. 6 is a timing chart to show timings of the drive signals SH, $\phi_1$, $\phi_R$ to the CCD sensor and CCDOUT as CCD output. Voltages generated in the light receiving elements $S_1, S_2, \ldots, S_N$ are transferred to the analog shift registers $SR_1, SR_2, \ldots, SR_N$, respectively, and are successively shifted in synchronism with the transfer clocks $\phi_1, \phi_2$ to be output one by one from an output terminal of the shift registers.

FIG. 2 shows a general structure of scanner. The scanner as shown is of a reflection read-transmission read changeover type.

The scanner is provided with a scattering plate 1 on which a document (not shown) is placed, a glass table 2 for holding the scattering plate 1, a light source 3 located underneath the glass table 2, a transmission reading (TR) optical unit 4 located over the scattering plate 1, a TR optical unit sensor 8 for determining a reference position of the TR optical unit 4, a reflection reading (RR) optical unit located underneath the scattering plate 1, and a RR optical unit sensor 13 for determining a reference position of the RR optical unit 9. The TR optical unit 4 has a mirror 5, a lens and a CCD sensor 7. Also, the RR optical unit 9 has a mirror 10, a lens 11, and a CCD sensor 12.

In transmission reading, light emitted from the light source 8 passes through the glass table 2 and the scattering plate 1 to illuminate the document. The light passing through the document is reflected by the mirror 5. The light reflected by the mirror 5 is condensed by the lens 8 to impinge on a light-receptive surface of the CCD sensor 7.

In reflection reading, the scattering plate 1 is removed and the light emitted from the light source 3 passes through the glass table 2 to illuminate the document. The light reflected by the document again passes through the glass table 2 and is then reflected by the mirror 10. The light reflected by the mirror 10 is condensed by the lens 11 to impinge on a light-receptive surface of the CCD sensor 12.

The TR optical unit 4 and the RR optical unit 9 each are driven to move by an unrepresented feeder in the direction represented by the arrow A in FIG. 2. The light source 3 and the RR optical unit 9 are driven by a single driving system, and the TR optical unit 4 by another driving system.

Immediately after reading start, the light source 3 and the TR optical unit 4 are first set at the respective reference positions through the RR optical unit sensor 13 and the TR optical unit sensor 8, respectively. FIG. 2 shows a state in which the light source 3 and the TR optical unit 4 are then moved a little by moving amounts a1 and a2, respectively. Since absolute amounts are still small for the moving amounts a1 and a2 from the reference positions, errors in moving amounts are also small due to variations in driving systems, whereby the relative positional relation is kept accurate between the light source 3 and the TR optical unit 4.

Meantime, as the reading position approaches the document edge, as shown in FIG. 3, the moving amounts b1 and b2 from the reference positions measured by the sensors increase their absolute values so as to increase an error |b1−b2| due to the variations in driving systems. The reason is as follows. The TR optical unit and the light source are independently driven by a same pulse number by the separate stepping motors. Thus, they can be accurately driven by the stepping motors. However, the driving systems (pulleys, gears, belt, wire, etc.) connected to the stepping motors do have variations. The variations increase their influence on the moving amounts as the moving amounts increase.

With such a change in relative positional relation between the light source 3 and the TR optical unit 4 as shown from FIG. 2 to FIG. 3, a quantity of light reaching the CCD sensor 7 varies even if the light source 3 emits a same quantity of light.

FIG. 9 shows a state of intensity distribution of scattered light emergent from the scattering plate 1 after the light emitted from the light source 3 is scattered by the scattering plate 1. It is shown in FIG. 9 that the light is widely scattered by the scattering plate 1. The intensity of the scattered light little changes at a point ⅛ mm away from a point of the maximum intensity, or at a point ¹⁄₁₂ mm therefrom, but a change in quantity of light reaches 10% or more at a point 2 mm away from the point of maximum intensity.

In FIG. 2, the light emitted from the light source 3 passes through the glass table 2 and is then scattered by the scattering plate 1. Most of scattered light is reflected by the mirror 5 and passes through the lens 8 to reach the CCD sensor 7. A quantity of light reaching the CCD sensor 7 is converted into digital image data. In FIG. 3, the light emitted from the light source 3 passes through the glass table 2 and is then scattered by the scattering plate 1 similarly as in FIG. 2. Since a lot of scattered light is lost on this occasion, only a little scattered light is reflected by the mirror 5 and passes through the lens 6 to reach the CCD sensor 7. Accordingly, the quantity of light is greatly decreased at the reading end as compared with that at the reading start.

When the relative positional relation between the light source 3 and the TR optical unit 4 changes for example from FIG. 2 to FIG. 3 as described, the light quantity reaching the CCD sensor 7 also varies, which raises a problem that the brightness of image changes even upon reading a document of uniform density. This problem is serious in a color scanner in which a plurality of fluorescent tubes are juxtaposed, because changing quantities of light from the fluorescent tubes are different from each other. This could cause abnormality in color balance.

SUMMARY OF THE INVENTION

The present invention has been accomplished solving the above problem. It is an object of the present invention to provide a scanner which can keep the quantity of light reaching the CCD sensor constant with a change in reading position.

The above object of the present invention can be achieved by a scanner for reading an image on a document, comprising:

a light source for illuminating the document to provide optical information of the image;

a reading optical unit for reading said optical information of the image;

first moving means for moving the light source along the document;

second moving means for moving the reading optical unit along the document;

measuring means for measuring a moving amount of each of the light source and the reading optical unit as moved along a test chart to read a predetermined length on the test chart;

storing means for storing information concerning said moving amounts; and correcting means for correcting a moving amount of the light source through said first moving means, based on the information thus stored, when said reading optical unit reads the optical information of the image on the document.

The measuring means uses the reading optical unit in reading the test chart to measure a moving amount thereof. The reading optical unit may be a transmission-type reading optical unit which reads optical information of an image obtained when light from the light source passes through the document.

The measuring means has a second reading optical unit which may be used to measure a moving amount of the light source. The second reading optical unit may be a reflection-type reading optical unit which reads information of an image obtained when light from the light source is reflected by the document.

The storing means may be a programmable non-volatile memory.

The test chart comprises a black portion of the predetermined length and a transparent portion transmitting light.

The first and second moving means may be stepping motors. In that case, each of the stepping motors gives a moving amount of the light source or the first reading optical unit as a number of steps.

Further, the storing means may be an EEPROM, which stores a quotient and a remainder obtained by dividing the number of steps given by each stepping motor by a predetermined value.

The test chart is first read to measure the moving amounts of the light source and the reading optical unit. In reading a document, the reading optical unit is first moved by a predetermined amount. The light source is moved with a correction based on the first measured moving amounts if necessary. Then, a one-line reading process is carried out by the reading optical unit. The document is read by repeating movement of the optical unit, movement of the light source, and the one-line reading process.

Since the scanner of the present invention is provided with the means for reading the test chart of the predetermined length to measure the respective moving amounts of the light source and the reading optical unit, the storing means for storing the measured moving amounts, and the means for correcting a moving amount of the light source, based on the thus measured moving amounts, the change in quantity of light depending upon a difference of reading position can be suppressed to the utmost.

Further objects and advantages of the present invention will be apparent from the following description of the preferred embodiment of the invention as illustrated in the accompanying drawings.

DESCRIPTION OF THE PREFERRED EMBODIMENT

An embodiment of scanner according to the present invention will be described in detail in the following.

Figure 2:
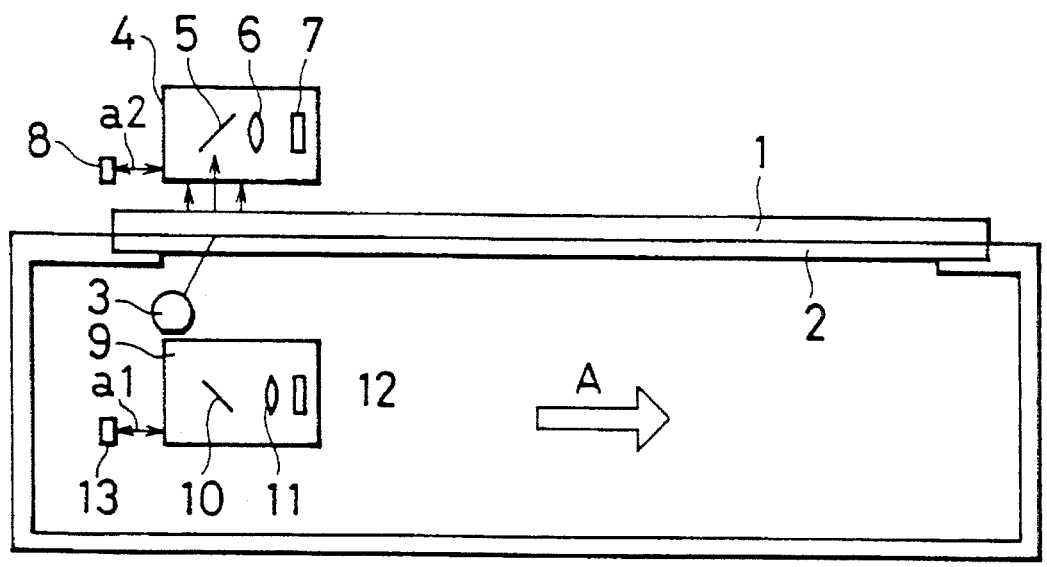
FIG. 2 is a drawing to show positions of light emitting portion and light receiving portion immediately after reading start.
Figure 3:
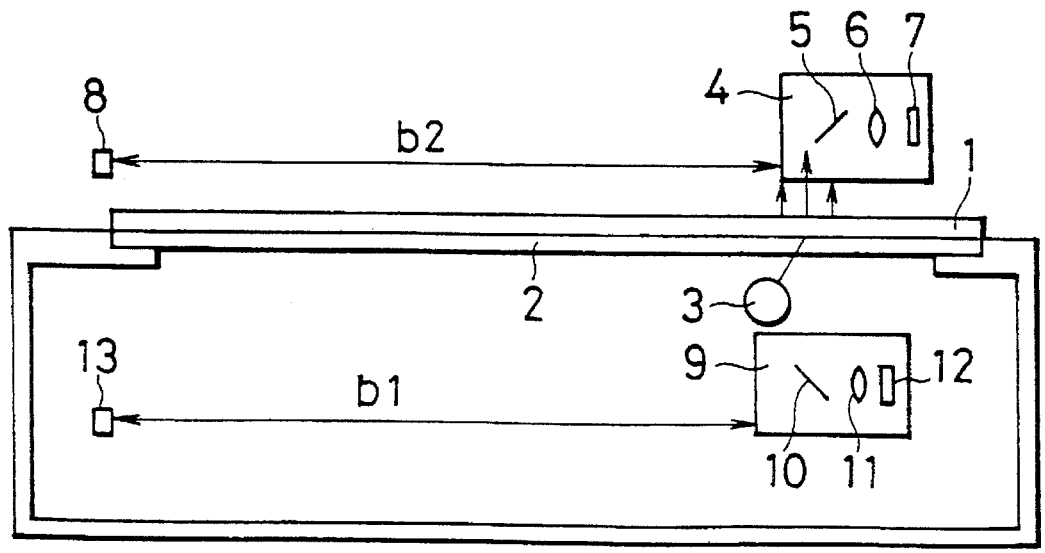
FIG. 3 is a drawing to show positions of light emitting portion and light receiving portion immediately after reading end.

The scanner has the same structure as shown in FIG. 2. In more detail, the scanner is provided with a scattering plate 1 on which a document (not shown) is placed, a glass table 2 for holding the scattering plate 1, a light source 3 located underneath the scattering plate 1, a TR optical unit 4 located over the scattering plate 1, a TR optical unit sensor 8 for determining a reference position of the TR optical unit 4, a RR optical unit 9 located underneath the scattering plate 1, and a RR optical unit sensor 13 for determining a reference position of the RR optical unit 9.

Figure 4:
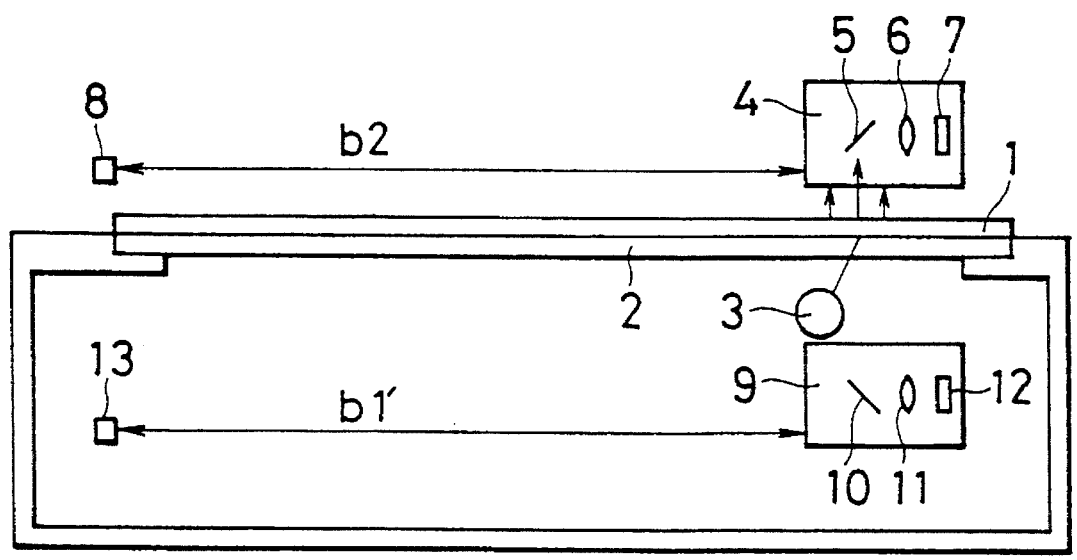
FIG. 4 is a drawing to show a correction of position of light source.
Figure 5:
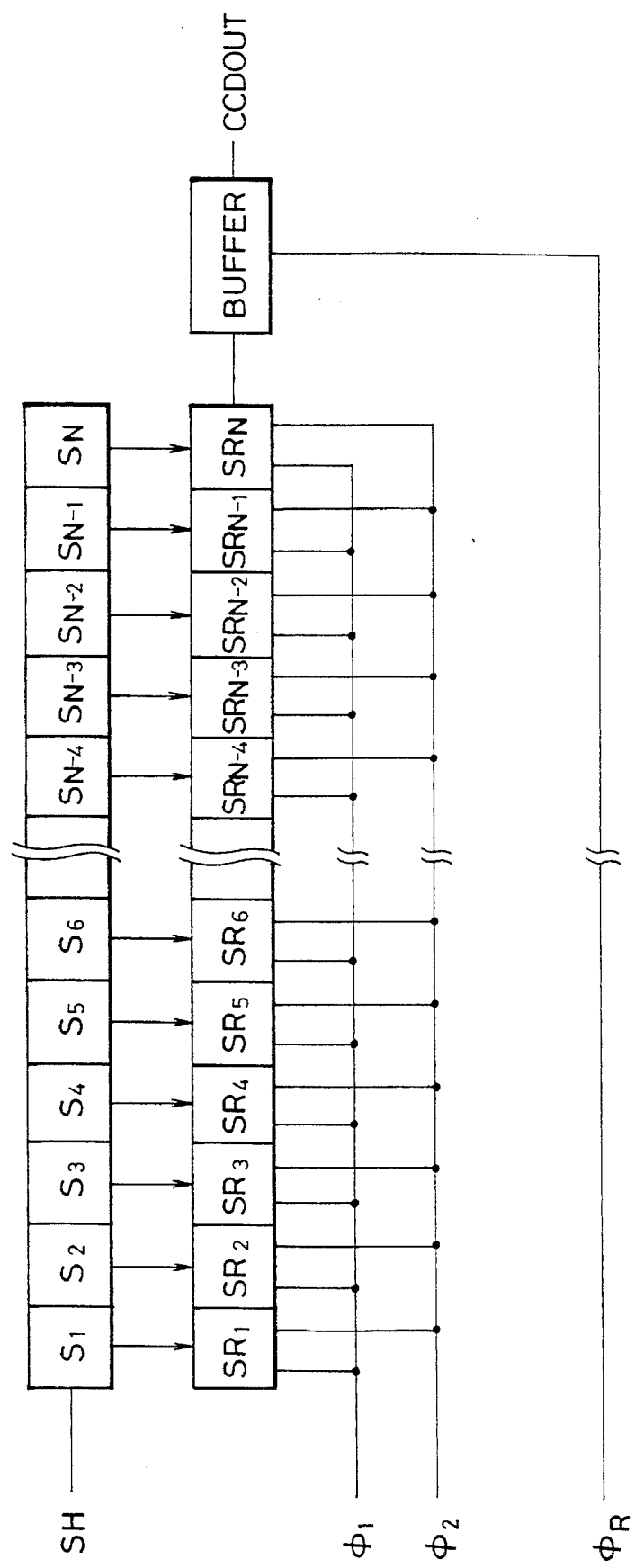
FIG. 5 is a circuit block diagram of CCD sensor.
Figure 6:
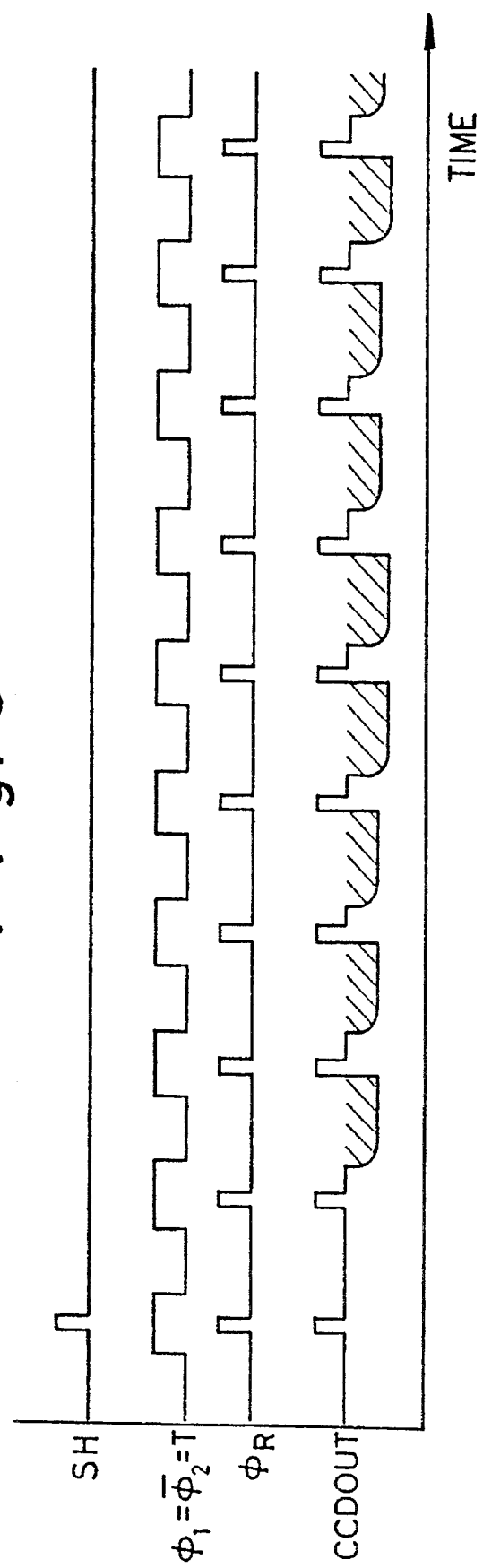
FIG. 6 is a time chart to show signals for driving the CCD sensor.

The basic idea of the present invention is that a moving amount of the light source 3 is made coincident with a moving amount of the TR optical unit 4 to prevent a change in quantity of light. The present embodiment employs a method for adjusting the moving amount of light source 3 as to be equal to that of TR optical unit 4. The reason of this is that the position of TR optical unit 4 is an actual position of image reading. The moving amount of light source 3 is corrected as shown in FIG. 4 such that a moving amount b1' thereof becomes equal to a moving amount b2 of the optical unit 4.

Also, the scanner of the present embodiment permits two modes of reflection document reading and transmission document reading, and has a resolution of 8 lines/mm.

Figure 7:
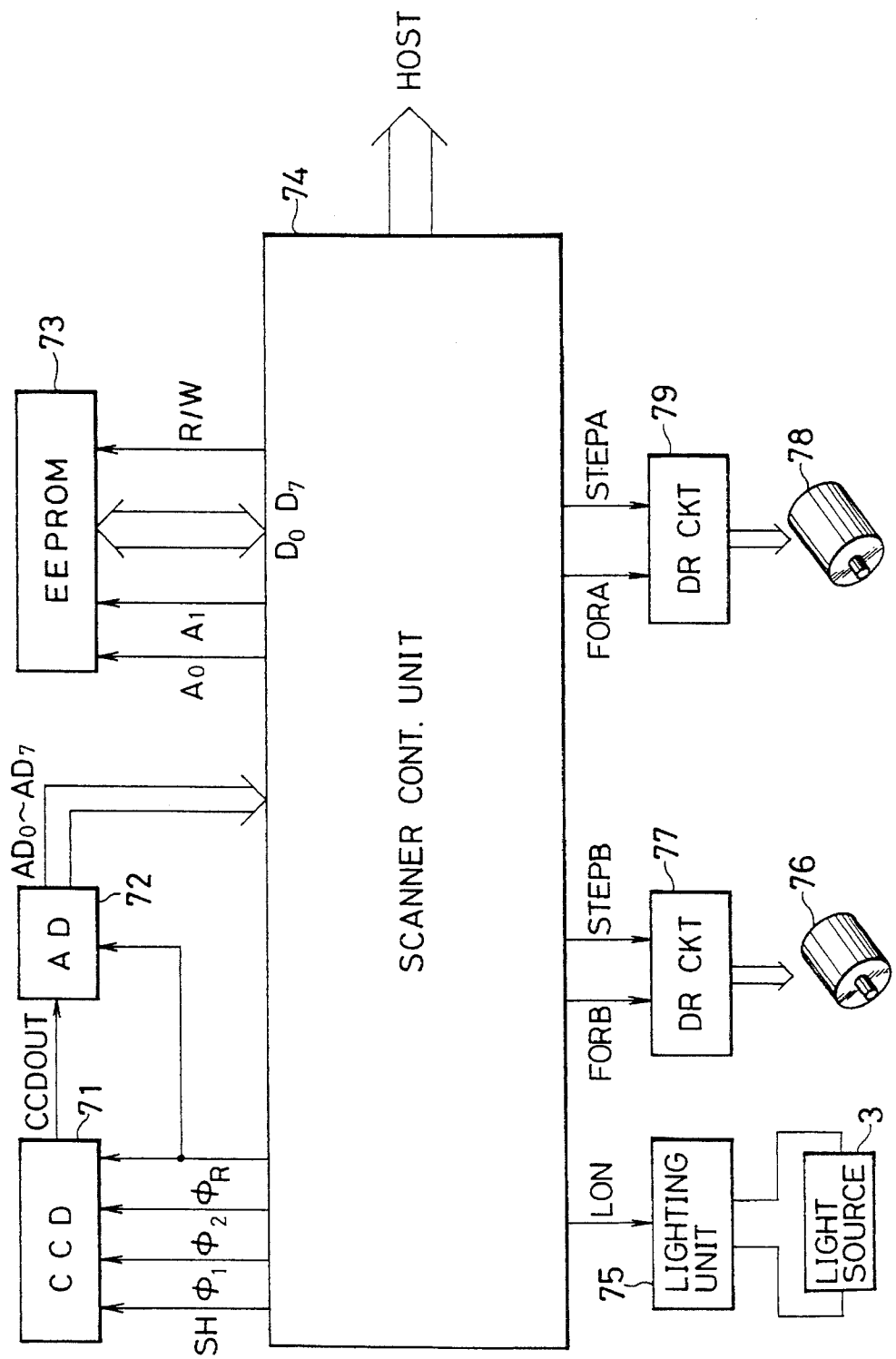
FIG. 7 is a block diagram of a scanner in an embodiment of the present invention.

FIG. 7 is a circuit block diagram of the scanner in the embodiment of the present invention. The scanner includes a CCD sensor 71 for receiving drive signals SH, $\phi_1$, $\phi_2$, $\phi_R$ from a scanner control circuit 74 and outputting CCDOUT as the CCD output, an AD converter 72 for receiving the CCD output of CCDOUT and converting it into a digital single, an EEPROM (electrically erasable programmable read-only memory) 73 for holding specified moving amounts of the light source 3 and the TR optical unit 4, a lighting unit 75 for lighting the light source 3, a stepping motor drive circuit 79 for driving a stepping motor 78, and a stepping motor drive circuit 77 for driving a stepping motor 76.

The A/D converter 72 converts an output CCDOUT from the CCD sensor 71 into digital data at a leading edge of $\phi_R$ on the 256-level gray scale and then transmits the 8-bit data AD0 to AD7 to the control circuit 74.

The EEPROM 73 has 8-bit I/O lines D0 to D7 connected to the control circuit 74, and its read-write signal R/W is supplied from the control circuit 74. Further, address signals A0, A1 are also supplied from the control circuit 74. Accordingly, the EEPROM 73 is one having a capacity of 4×8 bits. When an address receives certain data, the data is written in the address with R/W of '0' or the data is output from the address with R/W of '1'.

The lighting unit 75 lights the light source when a signal LON from the control circuit is '1'.

The stepping motor drive circuit 77 moves the light source 3 and the reflection optical unit 9 together forward or backward at the minimum step of ⅛ mm, as shown in FIG. 2. When a control signal FORB from the control circuit 74 is '1' and if a drive signal STEPB from the control circuit is changed once from '0' to '1', the light source 3 and the reflection optical unit 9 move ⅛ mm forward. In contrast, when the control signal FORB is equal to '0' and if the drive signal STEPB is changed once from '0' to '1', they move ⅛ mm backward.

The stepping motor drive circuit 79 moves the TR optical unit 4 forward or backward at the minimum step of ⅛ mm in FIG. 2. A control signal FORA and a drive signal STEPA from the control circuit 74 have the same functions as FORB and STEPB.

Figure 8:
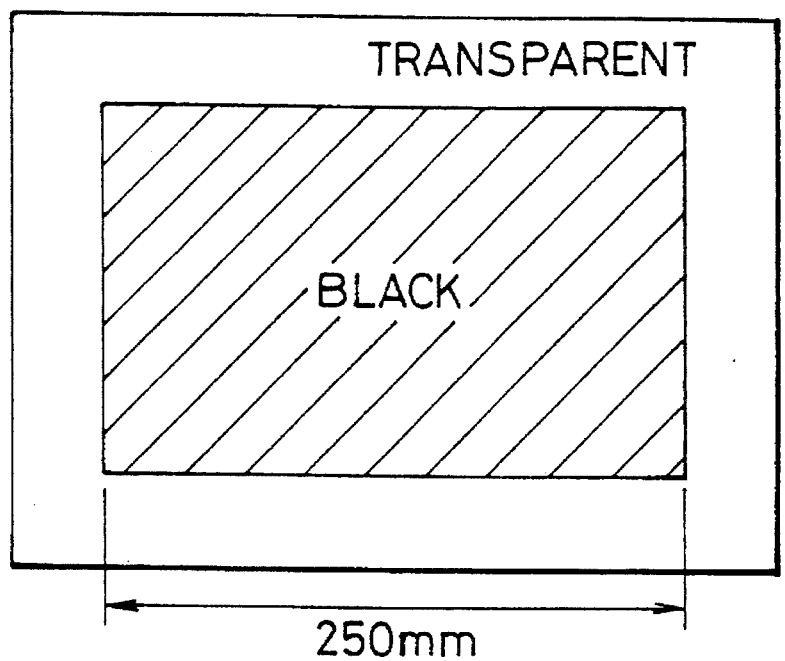
FIG. 8 is a test chart for measuring movement amounts.
Figure 9:
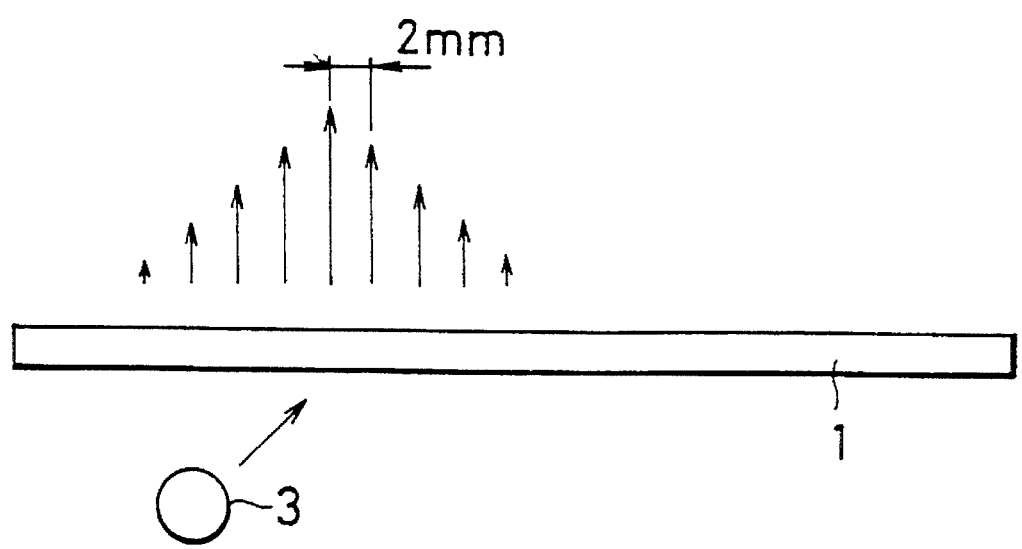
FIG. 9 is a drawing to show a state of scattered light widely scattered by a scattering plate.

FIG. 8 shows a test chart for measuring the moving amounts, which is used in the both modes of reflection and transmission. The test chart is a transparent film on which a black pattern is formed for example in the length of 250 mm. In order to use the test chart in the reflection mode, a white sheet larger than the test chart is set on the test chart.

First, the test chart of FIG. 8 is scanned in the transmission mode and in the white/black binary mode with resolution of 8 lines/mm. Suppose 2008 steps were necessary for scanning the entire length of black portion in the test chart. Although the black portion should be scanned by 2000 steps ideally, extra 8 steps were needed because of variations in the driving portion.

Since 2008=256×7+216, the control circuit 74 writes 216 at address 0 and 7 at address 1 in EEPROM 73.

In the next place, the test chart of FIG. 8 is scanned in the reflection mode and in the white/black binary mode with resolution of 8 lines/mm (actually with the white sheet being set on the test chart). Suppose the entire length of the black portion was scanned by 1995 steps in the reflection mode.

Since 1995=256×7+203, the control circuit 74 writes 203 at address 3 and 7 at address 4 in EEPROM 73. In this case, a step of TR optical unit 4 is longer than that of light source 3. Accordingly, when the moving distance is relatively long, the moving steps of the light source 3 must be thinned out to match with a moving amount of the optical unit 4.

Let us assume that the moving amounts are made coincident with each other for the length 250 mm of black portion in the test chart. Employing the linear approximate expression, 1995−2008=−13. Then, 13 pulses must be thinned out for movement of 2000 pulses.

Since 2000/13=153.8, a step must be thinned out per 154 steps. Then, when the TR optical unit 4 moves approximately by 2000 pulses, the moving amount of TR optical unit 4 is made nearly coincident with that of light source 3 (more precisely, 1988 steps if a step is thinned out per 154 steps).

The moving amount of TR optical unit 4 after 2000 pulses is $$250 \ mm \times 2000/2008 = 249.00398 \ mm.$$

Also, the moving amount of light source 3 after 1988 steps is $$250 \ mm \times 1988/1995 = 249.1228 \ mm.$$

A difference between the two moving amounts is 0.11882 mm, which will not greatly change the intensity of light from the light source in the final reading after movement of 250 mm as compared with that in the reading start.

The number of pulses for the optical unit 4 is basically neither decreased nor increased for the correction. This can prevent an oblique line from being stepped when read.

Let us now consider a case in which no correction is effected for movement of 2000 pulses. A moving amount of the TR optical unit 4 is $$250 \ mm \times 2000/2008 = 249.00398 \ mm.$$

A moving amount of the light source 3 is $$250 \ mm \times 2000/1995 = 250.62656 \ mm.$$

A difference between the two moving amounts is 1.62258 mm. In this case, the intensity of light from the light source in the final reading after movement of 250 mm would be largely different from that in the reading start.

Figure 1:
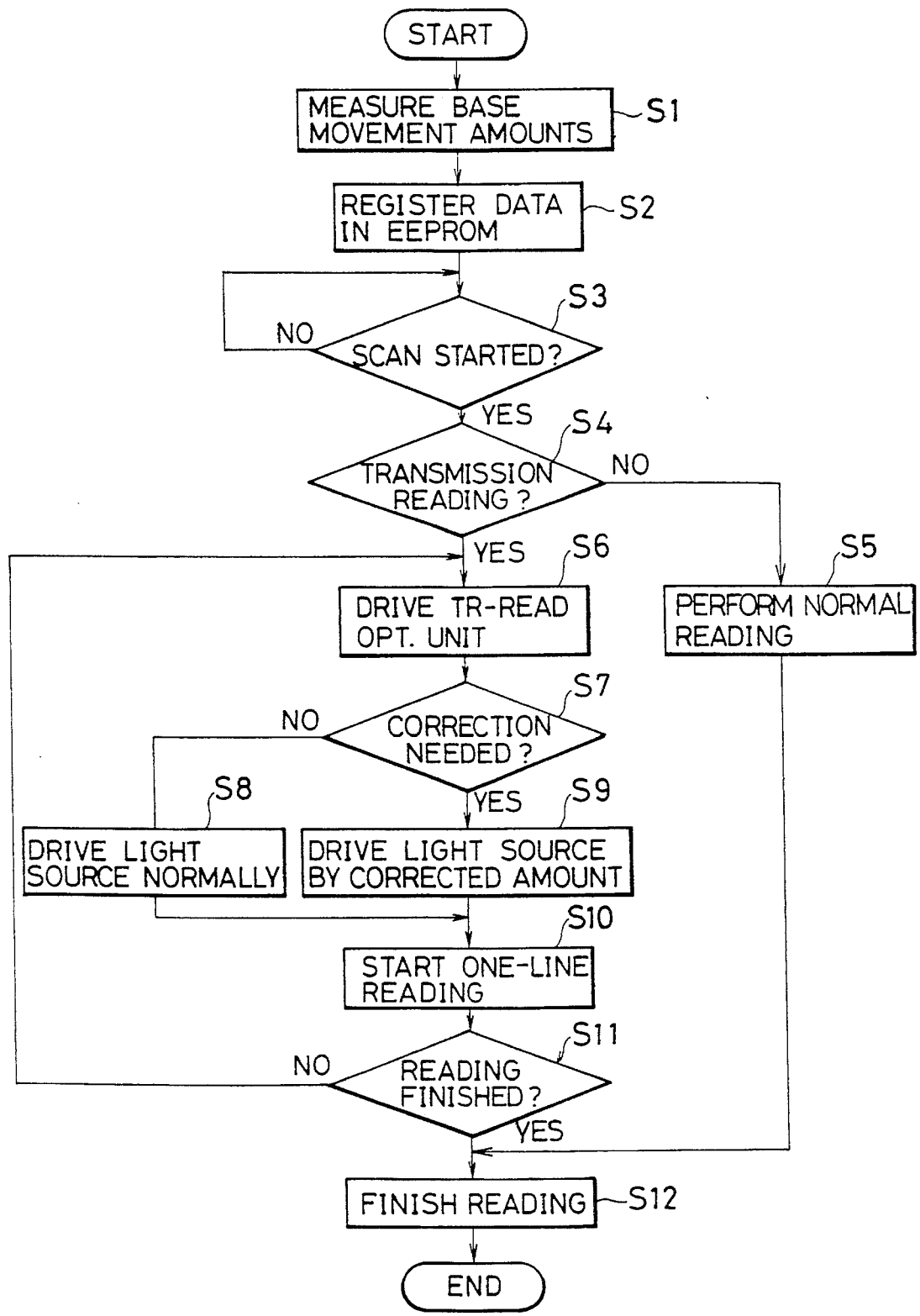
FIG. 1 is a flow chart in an embodiment of the present invention.

Next described with the flow chart in FIG. 1 is correction processing of moving amount of light source 3, executed by the control circuit 74 in cooperation with the peripheral devices.

First at Step S1, a basic moving amount is measured in each of the transmission mode and the reflection mode, using the test chart of FIG. 8. The test chart in FIG. 8 is scanned in the white/black binary mode with resolution of 8 lines/mm to measure a number of steps necessary for scanning the black portion in the test chart. Then, a number of steps in the transmission mode is integrally divided by 256. Let AH be an obtained quotient and AL be a remainder.

The same operation is conducted in the reflection mode. Then, a number of steps in the reflection mode is integrally divided by 256. Let BH be an obtained quotient and BL be a remainder.

Next at Step S2, the values of AL, AH, BL and BH obtained at Step S1 are stored in EEPROM 73, which is programmable and which can store the values even in a power-off condition. AL is stored at address 0, AH at address 1, BL at address 2, and BH at address 3.

After the above processes are completed, it is judged at Step S3 whether an instruction of document scan start is provided through an instructing device (not shown). The judgment is repeated at Step S3 before an instruction is given. When an instruction is given, the flow proceeds to the next step.

It is next judged at Step S4 whether the transmission reading or the normal reading should be conducted. Whether the transmission reading or the normal reading should be conducted is instructed through the unrepresented instructing device.

The flow goes to Step S6 if the transmission reading is instructed. If not, the normal reading (reflection reading) is conducted at Step S5. Then the follow goes to Step S12.

At Step S8, the TR optical unit 4 is driven by a certain feed amount corresponding to the resolution.

It is then judged at Step S7 whether the correction of moving amount of light source is necessary.

A step correction amount XB of light source 3 can be calculated as follows for a moving step number XA of the optical unit 4.

$$XB=XA(BH\times 256+BL-AH\times 256-AL)/2000$$

If XB>0, an additional pulse or pulses are necessary; if XB<0, a thin-out pulse or pulses are necessary.

The moving amount of light source has to be corrected by the step number of XB for the total drive step number XA of the optical unit.

Then, if XB>0, a step is added per XA/XB steps.

If XB<0, a step is thinned out per XA/XB steps.

The above correction is effected on the moving amount of the light source.

Therefore, whether the correction of moving amount of light source is necessary can be determined by judging whether the total drive step number XA of the optical unit reaches N×XA/XB (where N is an integer).

In case it is judged that no correction is needed for a moving amount of light source, the flow goes to Step S8 to drive the light source by an amount corresponding to the resolution by normal steps.

If it is judged that the correction is necessary for a moving amount of light source, the flow goes to Step S9 to move the light source by a corrected amount by steps obtained by adding a step to normal steps or thinning out a step from the normal steps.

One-line reading is next carried out at Step S10. It is judged at Step S11 whether the reading is completed. Unless the reading is completed, the Flow returns to Step S6. A reading finishing process is conducted at Step S12.

As described above, the relative positional relation is kept accurate between the TR optical unit and the light source, so that the quantity of light can be kept unchanged regardless of the reading position, suppressing a change in brightness or a change in color balance of read image. The effect can be easily attained without highly increasing the accuracy of driving system and without requiring a special mechanical component except for the electrical memory element (EEPROM).

Many widely different embodiments of the present invention may be constructed without departing from the spirit and scope of the present invention. It should be understood that the present invention is not limited to the specific embodiments described in the specification, except as defined in the appended claims.

What is claimed is:

1. A scanner for reading an image on a document, comprising:

a light source for illuminating the document to provide optical information of the image;

a reading optical unit for reading said optical information of the image;

first moving means for moving the light source along the document;

second moving means for moving the reading optical unit along the document;

measuring means for measuring a moving amount of each of the light source and the reading optical unit as moved along a test chart to read a predetermined length on the test chart;

storing means for storing information concerning said moving amounts; and correcting means for correcting a moving amount of the light source through said first moving means, based on the information thus stored, when said reading optical unit reads the optical information of the image on the document.

2. A scanner according to claim 1, wherein said measuring means measures a moving amount of the reading optical unit to read the test chart, using said reading optical unit.

3. A scanner according to claim 2, wherein said reading optical unit is a transmission-type reading optical unit which reads optical information of an image obtained when light from the light source passes through the document.

4. A scanner according to claim 1, wherein said measuring means has a second reading optical unit, said measuring means measuring a moving amount of said light source using said second reading optical unit.

5. A scanner according to claim 4, wherein said second reading optical unit is a reflection-type reading optical unit which reads optical information of an image obtained when light from the light source is reflected by the document.

6. A scanner according to claim 1, wherein said storing means is a programmable non-volatile memory.

7. A scanner according to claim 1, wherein said test chart comprises a black portion of the predetermined length and a transparent portion transmitting light.

8. A scanner according to claim 1, wherein said first and second moving means are stepping motors.

9. A scanner according to claim 8, wherein each of said stepping motors provides a moving amount of the light source or the first reading optical unit as a number of steps.

10. A scanner according to claim 9, wherein said storing means is an EEPROM, said EEPROM storing a quotient and a remainder obtained by dividing the number of steps given by each stepping motor by a predetermined value.

* * * * *